United States Patent
Chae

(10) Patent No.: US 11,423,881 B2
(45) Date of Patent: Aug. 23, 2022

(54) METHOD AND APPARATUS FOR UPDATING REAL-TIME VOICE RECOGNITION MODEL USING MOVING AGENT

(71) Applicant: LG ELECTRONICS INC., Seoul (KR)

(72) Inventor: Jonghoon Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 443 days.

(21) Appl. No.: 16/573,713

(22) Filed: Sep. 17, 2019

(65) Prior Publication Data

US 2020/0013392 A1 Jan. 9, 2020

(30) Foreign Application Priority Data

Sep. 2, 2019 (KR) .................. 10-2019-0108336

(51) Int. Cl.
| | | |
|---|---|---|
| *G10L 15/065* | (2013.01) | |
| *G10L 15/183* | (2013.01) | |
| *H04L 5/00* | (2006.01) | |
| *H04L 7/04* | (2006.01) | |
| *H04W 52/14* | (2009.01) | |
| *H04L 9/40* | (2022.01) | |

(52) U.S. Cl.
CPC .......... *G10L 15/065* (2013.01); *G10L 15/183* (2013.01); *H04L 5/0051* (2013.01); *H04L 7/041* (2013.01); *H04L 63/04* (2013.01); *H04W 52/146* (2013.01)

(58) Field of Classification Search
CPC .............................. G10L 15/00; G10L 15/065
See application file for complete search history.

(56) References Cited

U.S. PATENT DOCUMENTS

| | | | |
|---|---|---|---|
| 6,577,999 B1 * | 6/2003 | Lewis ................... | G10L 15/187 704/270 |
| 8,983,844 B1 * | 3/2015 | Thomas .................. | G10L 15/20 704/270.1 |
| 9,159,315 B1 * | 10/2015 | Mengibar ............. | G10L 15/005 |

(Continued)

FOREIGN PATENT DOCUMENTS

| | | |
|---|---|---|
| KR | 10-2019-0018282 A | 2/2019 |
| KR | 10-2019-0094316 A | 8/2019 |

(Continued)

*Primary Examiner* — Paras D Shah
(74) *Attorney, Agent, or Firm* — Birch, Stewart, Kolasch & Birch, LLP

(57) ABSTRACT

According to an embodiment of the present disclosure, a method of updating a speech recognition model using a mobile agent in real-time comprises obtaining, in real-time, space type information for a particular space where the mobile agent is located, varying, in real-time, parameters of a speech recognition model used in the particular space based on the space type information, and performing a speech recognition service based on the speech recognition model including the varied parameters. Embodiments of the present disclosure may be related to artificial intelligence (AI) devices, unmanned aerial vehicles (UAVs), robots, augmented reality (AR) devices, virtual reality (VR) devices, and 5G service-related devices.

15 Claims, 15 Drawing Sheets

(56) References Cited

U.S. PATENT DOCUMENTS

| | | | | |
|---|---|---|---|---|
| 2008/0071540 A1* | 3/2008 | Nakano | ............... | G10L 15/20 |
| | | | | 704/251 |
| 2011/0295590 A1* | 12/2011 | Lloyd | ............... | G10L 15/30 |
| | | | | 704/8 |
| 2014/0278389 A1* | 9/2014 | Zurek | ............... | G10L 15/20 |
| | | | | 704/231 |
| 2018/0061409 A1* | 3/2018 | Valentine | ............ | G10L 15/24 |
| 2019/0371311 A1* | 12/2019 | Patel | ............ | G06F 3/167 |
| 2020/0005795 A1* | 1/2020 | Chae | ............ | G10L 15/08 |
| 2020/0075044 A1* | 3/2020 | Jankowski, Jr | ....... | G10L 15/183 |
| 2020/0193979 A1* | 6/2020 | Sun | ............ | G10L 25/51 |
| 2021/0043204 A1* | 2/2021 | Hwang | ............ | G10L 25/84 |

FOREIGN PATENT DOCUMENTS

| | | | | |
|---|---|---|---|---|
| KR | 10-2019-0101328 A | 8/2019 | | |
| WO | WO-2021011442 A1 * | 1/2021 | ........... | H04L 5/0023 |

* cited by examiner

【Figure 1】
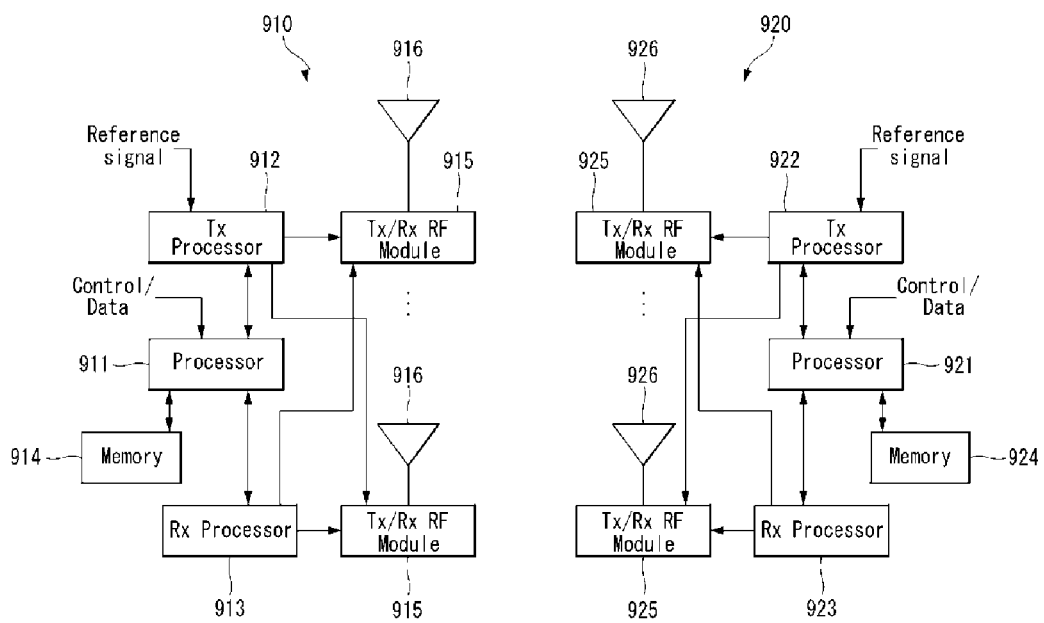

[Figure 2]
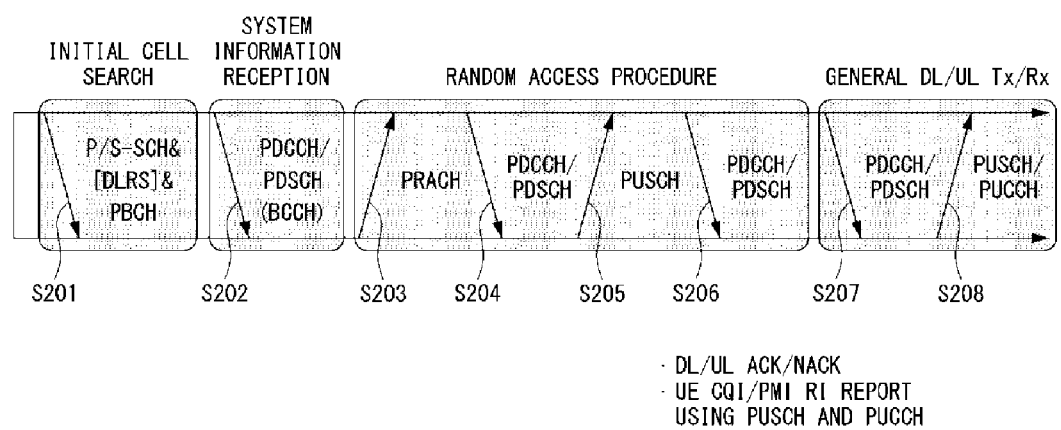

【Figure 3】
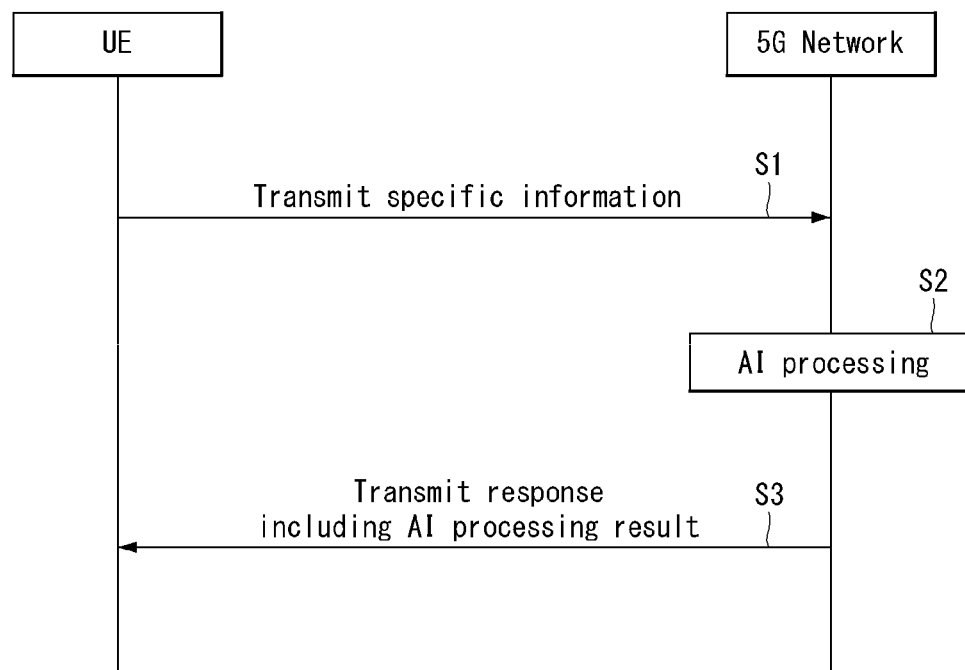

【Figure 4】
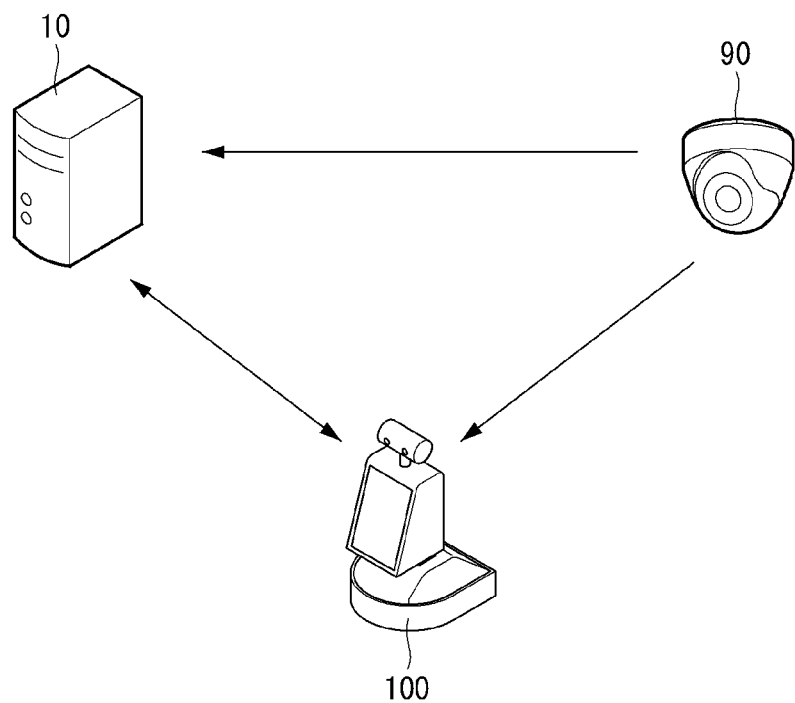

[Figure 5]
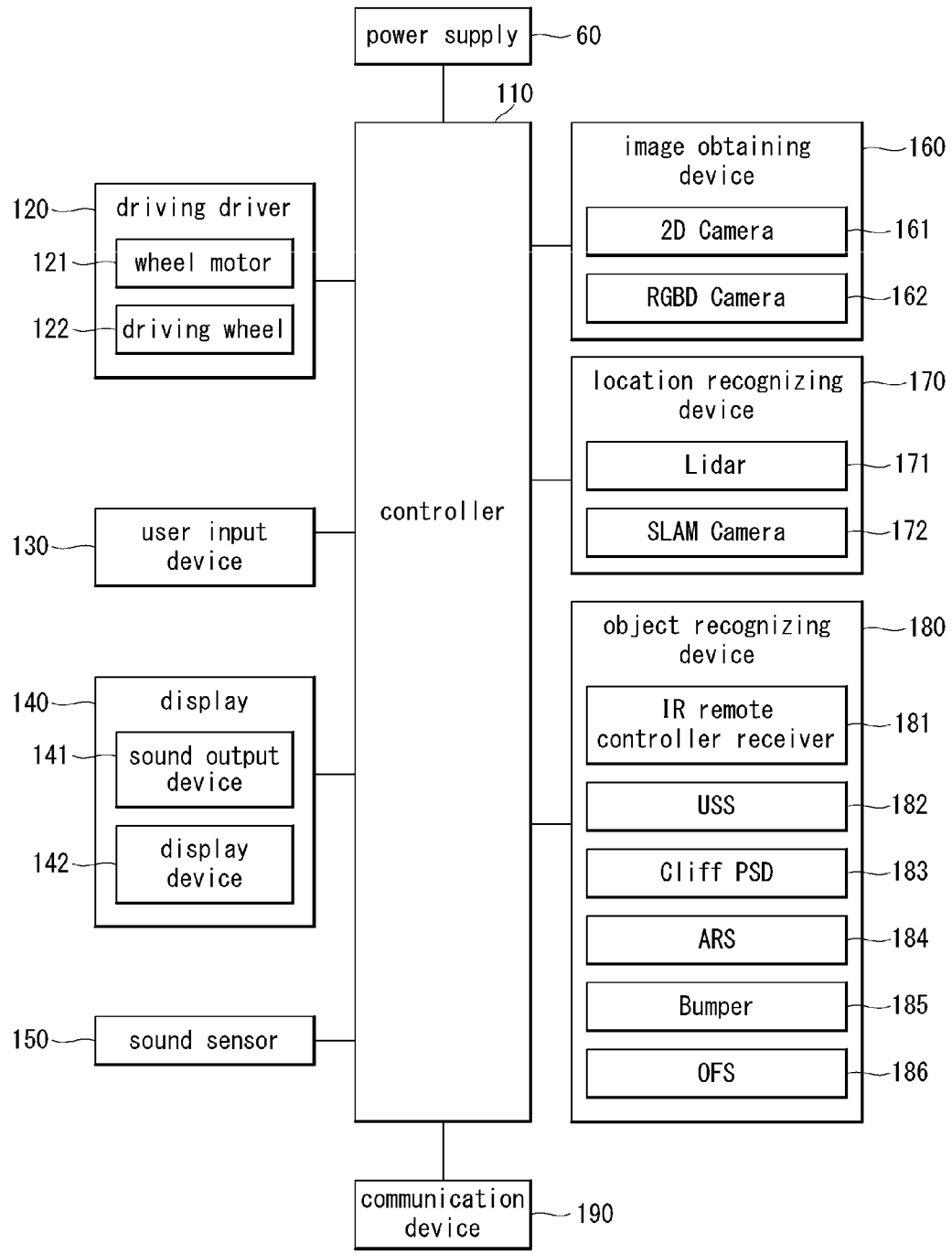

[Figure 6]
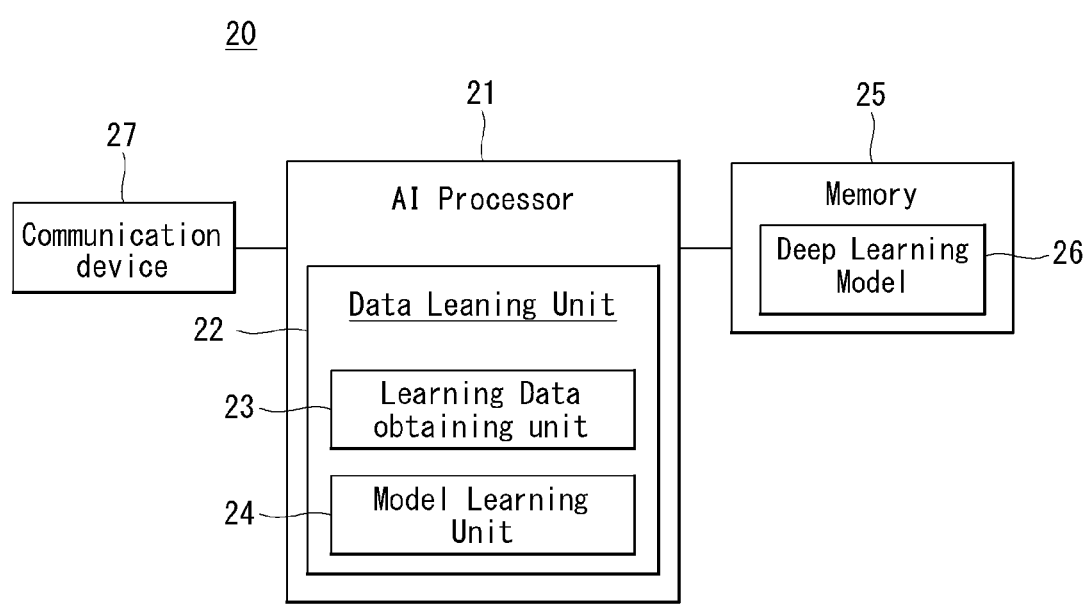

[FIG. 7]
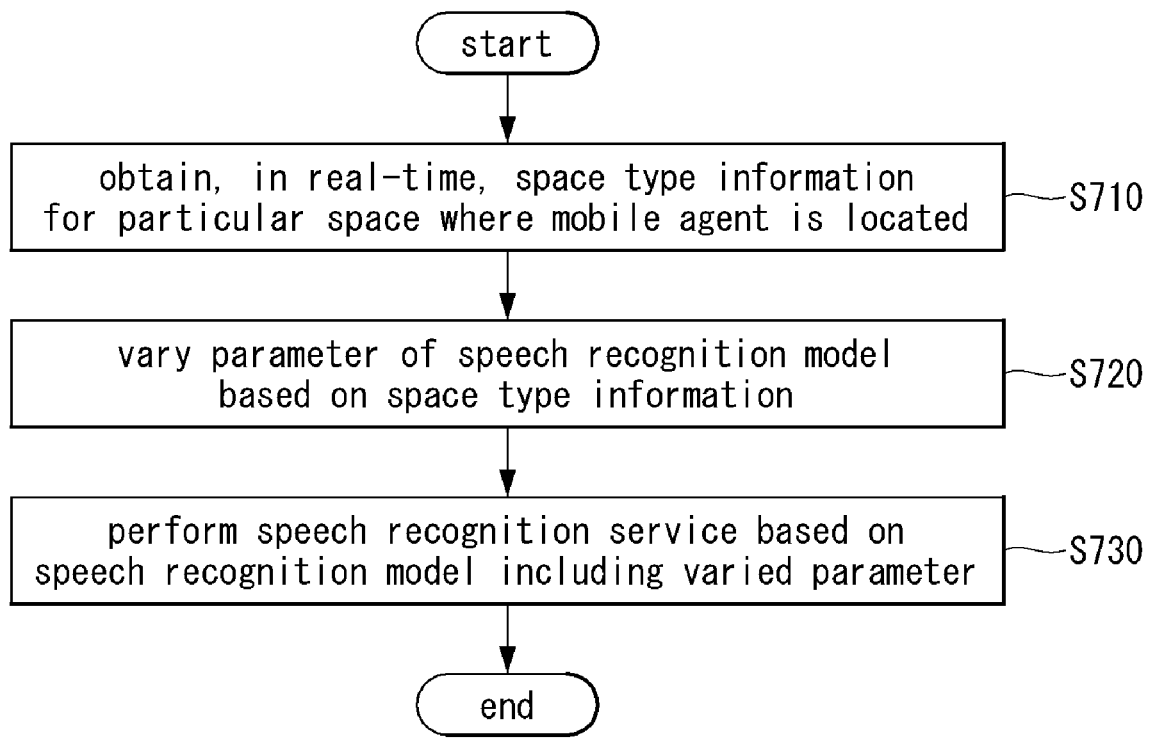

[Figure 8]
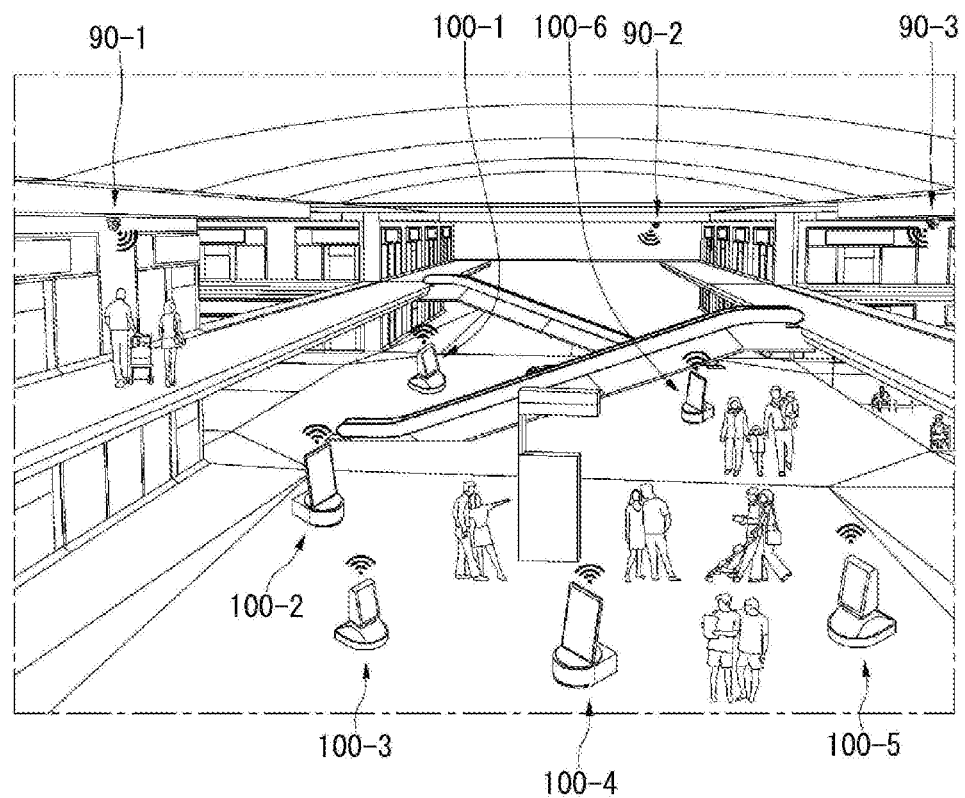

【Figure 9A】
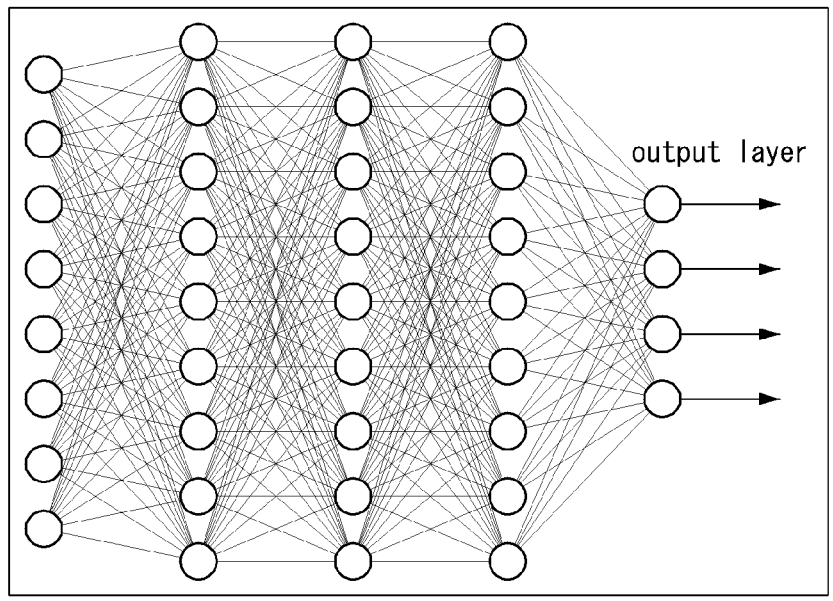
【Figure 9B】
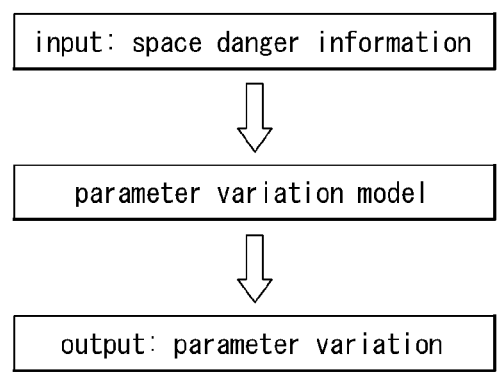

[Figure 10]
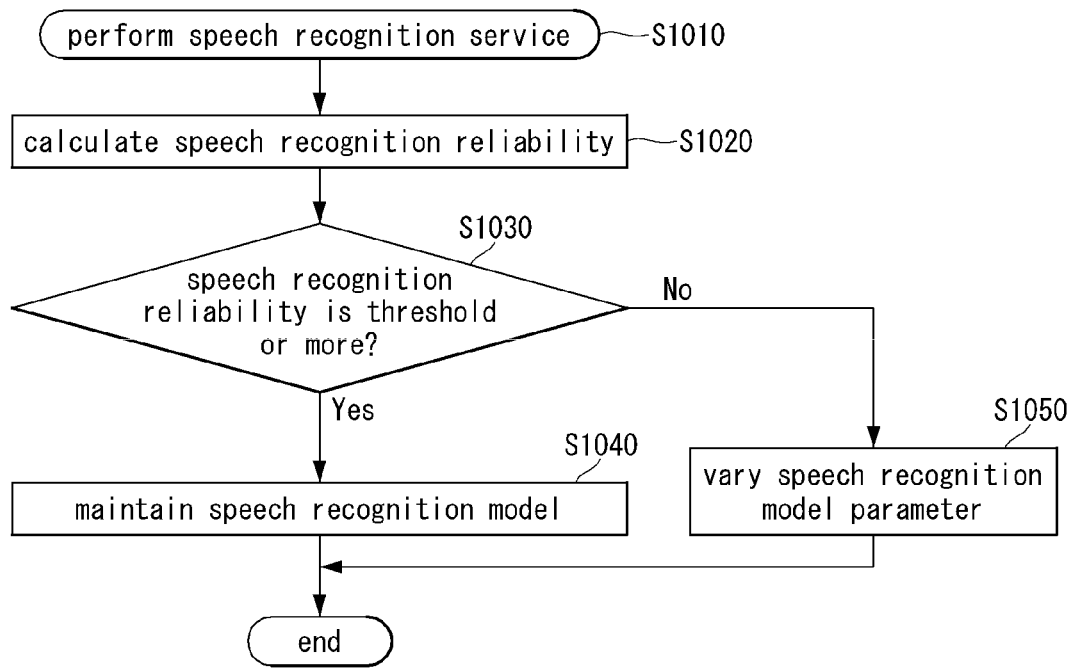

[Figure 11]
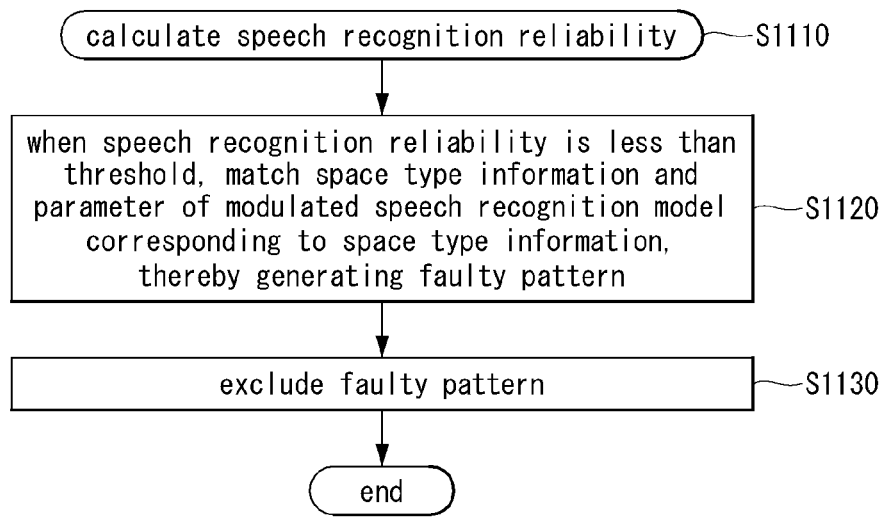

[Figure 12]
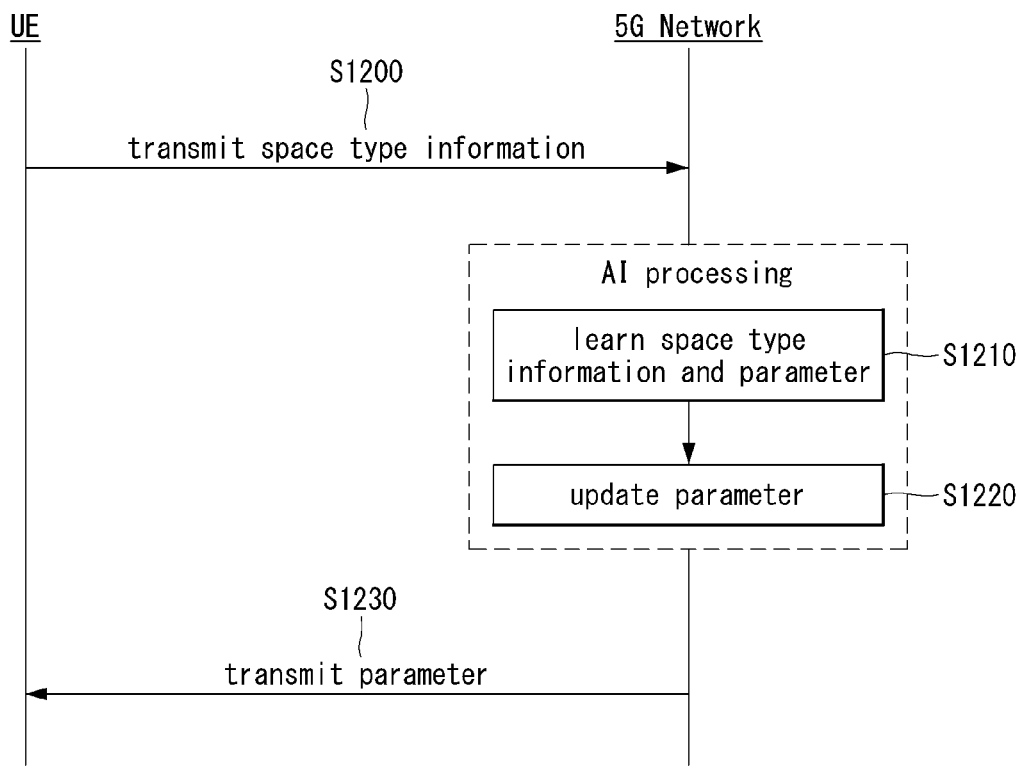

[Figure 13]
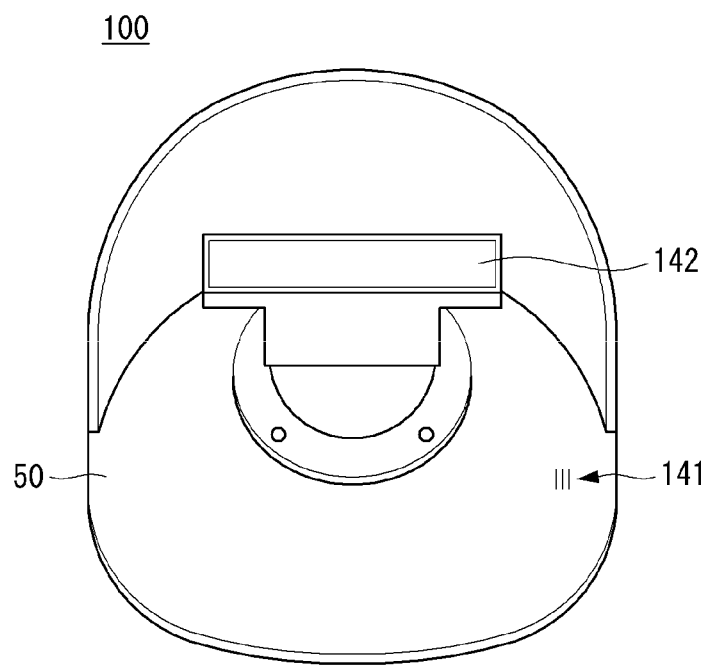

【Figure 14】
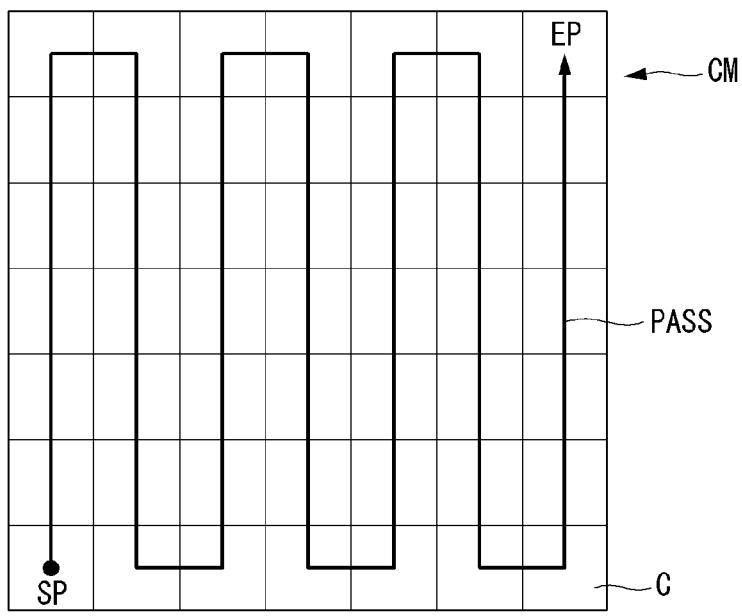

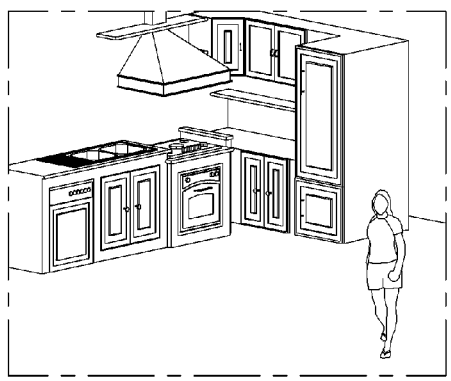
【Figure 15A】
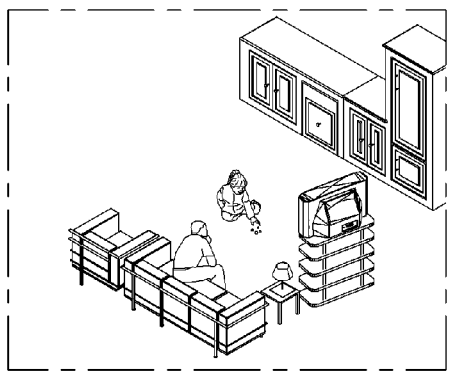
【Figure 15B】
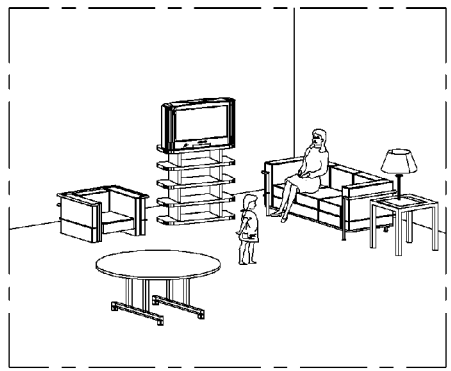
【Figure 15C】

METHOD AND APPARATUS FOR UPDATING REAL-TIME VOICE RECOGNITION MODEL USING MOVING AGENT

CROSS-REFERENCE TO RELATED APPLICATION

This application is based on and claims priority under 35 U.S.C. 119 to Korean Patent Application No. 10-2019-0108336, filed on Sep. 2, 2019, in the Korean Intellectual Property Office, the disclosure of which is herein incorporated by reference in its entirety.

TECHNICAL FIELD

Embodiments of the present disclosure relate to a method and apparatus for updating a speech recognition model using a mobile agent in real-time, and more specifically, to updating, in real-time, a speech recognition model considering space types.

DESCRIPTION OF RELATED ART

User control-operated devices provide a user interface through which users may perform control operations. User interfaces are evolving from direct control of the own functions and operations of devices to control which requires less physical power and may be achieved by intuitive operations.

Recently increasing are speech recognition-enabled devices which may grasp users' speeches and accordingly perform a certain function or operation. As language expressed in speech is a most natural human communication tool, speech recognition-based devices may be very intuitive and convenient to use.

Speech recognition-based devices are accompanied by the operations of interpreting users' speech and generating a particular control signal based on the interpreted speech. In speech recognition devices, speech interpretation is a critical process that should precede for the devices to precisely perform operations. There are thus being proposed various schemes to allow speech recognition devices to precisely interpret users' speech information. For example, since the speech signal for indicating a particular command may be varied depending on each user's pronunciation, intonation, or dialect, there are provided speech recognition models capable of interpreting various pieces of speech information.

However, even with enhanced capability of user speech interpretation, a limitation still remains on achieving a better accuracy of speech recognition interpretation due to the fact that the speech received by the speech recognition device is not limited to the one from the user. This is why ambient noise or howling sounds or other factors affect speech transfer although speech information is received from the same user.

No method exists of eliminating factors which may deteriorate the accuracy of speech information transfer.

SUMMARY

The present disclosure aims to address the foregoing issues and/or needs.

According to the present disclosure, there is provided preventing deterioration of the accuracy of speech recognition due to factors which vary depending on space types during the course of interpreting speech information.

According to an embodiment of the present disclosure, a method of updating a speech recognition model using a mobile agent in real-time comprises obtaining, in real-time, space type information for a particular space where the mobile agent is located, varying, in real-time, parameters of a speech recognition model used in the particular space based on the space type information, and performing a speech recognition service based on the speech recognition model including the varied parameters.

Obtaining the space type information may include detecting entry of the mobile agent into the particular space by grasping a location of the mobile agent and receiving preset space type information corresponding to the particular space.

Obtaining the space type information may include obtaining sensing information corresponding to analog information or a particular physical quantity of the particular space by a sensing device and obtaining the space type information based on the sensing information.

Obtaining the space type information may include obtaining at least any one or more of area information, distance information, noise information, or howling information for the particular space based on the sensing information.

Obtaining the space type information may include obtaining a variation in the sensing information.

The speech recognition model may include a plurality of parameters each of which corresponds to a respective one of a plurality of speech processing schemes. Varying the parameters of the speech recognition model may include varying a size of at least any one of the plurality of parameters in proportion to the variation in the sensing information.

Varying the parameters of the speech recognition model may include performing artificial intelligence (AI) learning using the space type information as an input value.

The method may further comprise performing the speech recognition service based on the speech recognition model, determining a reliability of the speech recognition service, when the reliability of the speech recognition service is less than a preset threshold, matching the space type information and parameters of the speech recognition model modulated corresponding to the space type information to thereby generate a faulty pattern, and preventing the faulty pattern from being generated in the subsequent AI learning by dropping the faulty pattern.

The method may further comprise when the reliability of the speech recognition service is less than the preset threshold, varying again the parameters of the speech recognition model.

Varying the parameters of the speech recognition model may include receiving, from a network, downlink control information (DCI) used for scheduling transmission of the space type information. The space type information may be transmitted to the network based on the DCI.

Varying the parameters of the speech recognition model may include performing an initial access procedure with the network based on a synchronization signal block (SSB). The space type information may be transmitted to the network via a physical uplink shared channel (PUSCH). Dedicated demodulation reference signals (DM-RSs) of the SSB and the PUSCH may be quasi co-located (QCL) for QCL type D.

According to an embodiment of the present disclosure, a mobile agent performing a speech recognition service based on a speech recognition model comprises a sensing device obtaining sensing information corresponding to analog information or a particular physical quantity of a particular space and a controller obtaining space information based on the sensing information, obtaining space type information for the particular space, and varying, in real-time, parameters of the speech recognition model based on the space type information.

The controller may obtain area information, distance information, noise information, or howling information for the particular space, as the space type information, based on the sensing information.

The controller may obtain a variation in the sensing information and vary a size of at least one of the parameters of the speech recognition model in proportion to the variation in the sensing information.

The controller may perform AI learning using the space type information as an input value.

The controller may determine a reliability for performing the speech recognition service based on the speech recognition model and, when the reliability is less than a preset threshold, match the space type information and parameters of the speech recognition model modulated corresponding to the space type information to thereby generate a faulty pattern.

The controller may prevent the faulty pattern from being generated in the subsequent AI learning by dropping the faulty pattern.

The mobile agent may further comprise a communication device transmitting the space type information to a server or a 5G network and receiving the varied parameters of the speech recognition model generated based on the space type information.

According to an embodiment of the present disclosure, a real-time speech recognition model updating method using a mobile agent provides the following effects.

According to the present disclosure, the speech recognition model may be updated in real-time depending on the type of the space where the mobile agent is located, thereby enabling speech recognition adaptively to the ambient environment.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein:

FIG. 1 is a block diagram illustrating a wireless communication system to which methods proposed herein may apply;

FIG. 2 is a view illustrating an example signal transmission/reception method in a wireless communication system;

FIG. 3 is a view illustrating basic example operations of a user terminal and a 5G network in a 5G communication system;

FIG. 4 is a view illustrating an operating system of a mobile agent according to a first embodiment of the present disclosure;

FIG. 5 is a view illustrating a configuration of a mobile robot according to an embodiment of the present disclosure;

FIG. 6 is a block diagram illustrating an AI device according to an embodiment of the present disclosure;

FIG. 7 is a flowchart illustrating a method of updating a speech recognition model according to an embodiment of the present disclosure;

FIG. 8 is a view illustrating a method of obtaining space type information by a mobile robot;

FIGS. 9A and 9B are views illustrating a method of varying parameters of a speech recognition model;

FIG. 10 is a flowchart illustrating a method of updating a speech recognition model according to another embodiment of the present disclosure;

FIG. 11 is a flowchart illustrating a method of updating a speech recognition model according to another embodiment of the present disclosure;

FIG. 12 is a view illustrating a method of updating a speech recognition model according to another embodiment of the present disclosure;

FIGS. 13, 14, and 15 are views illustrating a method of updating a speech recognition model of a robot vacuum;

FIG. 14 is a view illustrating an example of setting a cleanup map by a robot vacuum; and FIGS. 15A, 15B, and 15C are views illustrating an example of space type information obtained by a robot vacuum.

DETAILED DESCRIPTION OF EXEMPLARY EMBODIMENTS

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus can be used interchangeably and do not have any distinguishable meanings or functions. Further, in the following description, if a detailed description of known techniques associated with the present disclosure would unnecessarily obscure the gist of the present disclosure, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

Hereinafter, 5G communication (5th generation mobile communication) required by an apparatus requiring AI processed information and/or an AI processor will be described through paragraphs A through G.

A. Example of Block Diagram of UE and 5G Network

FIG. 1 is a block diagram of a wireless communication system to which methods proposed in the disclosure are applicable.

Referring to FIG. 1, a device (AI device) including an AI module is defined as a first communication device (910 of FIG. 1), and a processor 911 can perform detailed AI operation.

A 5G network including another device (AI server) communicating with the AI device is defined as a second communication device (920 of FIG. 1), and a processor 921 can perform detailed AI operations.

The 5G network may be represented as the first communication device and the AI device may be represented as the second communication device.

For example, the first communication device or the second communication device may be a base station, a network node, a transmission terminal, a reception terminal, a wireless device, a wireless communication device, an autonomous device, or the like.

For example, the first communication device or the second communication device may be a base station, a network node, a transmission terminal, a reception terminal, a wireless device, a wireless communication device, a vehicle, a vehicle having an autonomous function, a connected car, a drone (Unmanned Aerial Vehicle, UAV), and AI (Artificial Intelligence) module, a robot, an AR (Augmented Reality) device, a VR (Virtual Reality) device, an MR (Mixed Reality) device, a hologram device, a public safety device, an MTC device, an IoT device, a medical device, a Fin Tech device (or financial device), a security device, a climate/environment device, a device associated with 5G services, or other devices associated with the fourth industrial revolution field.

For example, a terminal or user equipment (UE) may include a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user. For example, the HMD may be used to realize VR, AR or MR. For example, the drone may be a flying object that flies by wireless control signals without a person therein. For example, the VR device may include a device that implements objects or backgrounds of a virtual world. For example, the AR device may include a device that connects and implements objects or background of a virtual world to objects, backgrounds, or the like of a real world. For example, the MR device may include a device that unites and implements objects or background of a virtual world to objects, backgrounds, or the like of a real world. For example, the hologram device may include a device that implements 360-degree 3D images by recording and playing 3D information using the interference phenomenon of light that is generated by two lasers meeting each other which is called holography. For example, the public safety device may include an image repeater or an imaging device that can be worn on the body of a user. For example, the MTC device and the IoT device may be devices that do not require direct interference or operation by a person. For example, the MTC device and the IoT device may include a smart meter, a bending machine, a thermometer, a smart bulb, a door lock, various sensors, or the like. For example, the medical device may be a device that is used to diagnose, treat, attenuate, remove, or prevent diseases. For example, the medical device may be a device that is used to diagnose, treat, attenuate, or correct injuries or disorders. For example, the medial device may be a device that is used to examine, replace, or change structures or functions. For example, the medical device may be a device that is used to control pregnancy. For example, the medical device may include a device for medical treatment, a device for operations, a device for (external) diagnose, a hearing aid, an operation device, or the like. For example, the security device may be a device that is installed to prevent a danger that is likely to occur and to keep safety. For example, the security device may be a camera, a CCTV, a recorder, a black box, or the like. For example, the Fin Tech device may be a device that can provide financial services such as mobile payment.

Referring to FIG. 1, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

B. Signal Transmission/Reception Method in Wireless Communication System

FIG. 2 is a diagram showing an example of a signal transmission/reception method in a wireless communication system.

Referring to FIG. 2, when a UE is powered on or enters a new cell, the UE performs an initial cell search operation such as synchronization with a BS (S201). For this operation, the UE can receive a primary synchronization channel (P-SCH) and a secondary synchronization channel (S-SCH) from the BS to synchronize with the BS and acquire information such as a cell ID. In LTE and NR systems, the P-SCH and S-SCH are respectively called a primary synchronization signal (PSS) and a secondary synchronization signal (SSS). After initial cell search, the UE can acquire broadcast information in the cell by receiving a physical broadcast channel (PBCH) from the BS. Further, the UE can receive a downlink reference signal (DL RS) in the initial cell search step to check a downlink channel state. After initial cell search, the UE can acquire more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE can perform a random access procedure (RACH) for the BS (steps S203 to S206). To this end, the UE can transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed.

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH. The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three OFDM symbols. A network can configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH. The PDCCH can be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system will be additionally described with reference to FIG. 2.

The UE can perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE acquires time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/acquired through an SSS of the cell, and information on the cell ID among 336 cell ID groups is provided/acquired through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in a 5G communication system will be additionally described with reference to FIG. 2.

A random access procedure is used for various purposes. For example, the random access procedure can be used for network initial access, handover, and UE-triggered UL data transmission. A UE can acquire UL synchronization and UL transmission resources through the random access procedure. The random access procedure is classified into a contention-based random access procedure and a contention-free random access procedure. A detailed procedure for the contention-based random access procedure is as follows.

A UE can transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission on the basis of most recent pathloss and a power ramping counter.

The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

C. Beam Management (BM) Procedure of 5G Communication System

A BM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.

Configuration of a beam report using an SSB is performed when channel state information (CSI)/beam is configured in RRC_CONNECTED.

- A UE receives a CSI-ResourceConfig IE including CSI-SSB-ResourceSetList for SSB resources used for BM from a BS. The RRC parameter "csi-SSB-Resource-SetList" represents a list of SSB resources used for beam management and report in one resource set. Here, an SSB resource set can be set as {SSBx1, SSBx2, SSBx3, SSBx4, ... }. An SSB index can be defined in the range of 0 to 63.
- The UE receives the signals on SSB resources from the BS on the basis of the CSI-S SB-ResourceSetList.
- When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'ssb-Index-RSRP', the UE reports the best SSBRI and RSRP corresponding thereto to the BS.
- When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter. When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

- The UE receives an NZP CSI-RS resource set IE including an RRC parameter with respect to 'repetition' from a BS through RRC signaling. Here, the RRC parameter 'repetition' is set to 'ON'.
- The UE repeatedly receives signals on resources in a CSI-RS resource set in which the RRC parameter 'repetition' is set to 'ON' in different OFDM symbols through the same Tx beam (or DL spatial domain transmission filters) of the BS.
- The UE determines an RX beam thereof.
- The UE skips a CSI report. That is, the UE can skip a CSI report when the RRC parameter 'repetition' is set to 'ON'.

Next, the Tx beam determination procedure of a BS will be described.

- A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.
- The UE receives signals on resources in a CSI-RS resource set in which the RRC parameter 'repetition' is set to 'OFF' in different DL spatial domain transmission filters of the BS.
- The UE selects (or determines) a best beam.
- The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

- A UE receives RRC signaling (e.g., SRS-Config IE) including a (RRC parameter) purpose parameter set to 'beam management" from a BS. The SRS-Config IE is used to set SRS transmission. The SRS-Config IE includes a list of SRS-Resources and a list of SRS-ResourceSets. Each SRS resource set refers to a set of SRS-resources.
- The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.
- When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by servingCellID, configured having an information payload size for DCI format 2_1 according to dci-Payloadsize, and configured with indication granularity of time-frequency resources according to timeFrequencySect.

The UE receives DCI format 2_1 from the BS on the basis of the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. mMTC (Massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) retuning from a first frequency resource to a second frequency resource is performed in a guard period and the specific information and the response to the specific information can be transmitted/received through a narrowband (e.g., 6 resource blocks (RBs) or 1 RB).

F. Basic Operation Between Autonomous Vehicles Using 5G Communication

FIG. 3 shows an example of basic operations of an autonomous vehicle and a 5G network in a 5G communication system.

The autonomous vehicle transmits specific information to the 5G network (S1). The specific information may include autonomous driving related information. In addition, the 5G network can determine whether to remotely control the vehicle (S2). Here, the 5G network may include a server or a module which performs remote control related to autonomous driving. In addition, the 5G network can transmit information (or signal) related to remote control to the autonomous vehicle (S3).

G. Applied Operations Between Autonomous Vehicle and 5G Network in 5G Communication System Hereinafter, the operation of an autonomous vehicle using 5G communication will be described in more detail with reference to wireless communication technology (BM procedure, URLLC, mMTC, etc.) described in FIGS. 1 and 2.

First, a basic procedure of an applied operation to which a method proposed by the present disclosure which will be described later and eMBB of 5G communication are applied will be described.

As in steps S1 and S3 of FIG. 3, the autonomous vehicle performs an initial access procedure and a random access procedure with the 5G network prior to step S1 of FIG. 3 in order to transmit/receive signals, information and the like to/from the 5G network.

More specifically, the autonomous vehicle performs an initial access procedure with the 5G network on the basis of an SSB in order to acquire DL synchronization and system information. A beam management (BM) procedure and a beam failure recovery procedure may be added in the initial access procedure, and quasi-co-location (QCL) relation may be added in a process in which the autonomous vehicle receives a signal from the 5G network.

In addition, the autonomous vehicle performs a random access procedure with the 5G network for UL synchronization acquisition and/or UL transmission. The 5G network can transmit, to the autonomous vehicle, a UL grant for scheduling transmission of specific information. Accordingly, the autonomous vehicle transmits the specific information to the 5G network on the basis of the UL grant. In addition, the 5G network transmits, to the autonomous vehicle, a DL grant for scheduling transmission of 5G processing results with respect to the specific information. Accordingly, the 5G network can transmit, to the autonomous vehicle, information (or a signal) related to remote control on the basis of the DL grant.

Next, a basic procedure of an applied operation to which a method proposed by the present disclosure which will be described later and URLLC of 5G communication are applied will be described.

As described above, an autonomous vehicle can receive DownlinkPreemption IE from the 5G network after the autonomous vehicle performs an initial access procedure and/or a random access procedure with the 5G network. Then, the autonomous vehicle receives DCI format 2_1 including a preemption indication from the 5G network on the basis of DownlinkPreemption IE. The autonomous vehicle does not perform (or expect or assume) reception of eMBB data in resources (PRBs and/or OFDM symbols) indicated by the preemption indication. Thereafter, when the autonomous vehicle needs to transmit specific information, the autonomous vehicle can receive a UL grant from the 5G network.

Next, a basic procedure of an applied operation to which a method proposed by the present disclosure which will be described later and mMTC of 5G communication are applied will be described.

Description will focus on parts in the steps of FIG. 3 which are changed according to application of mMTC.

In step S1 of FIG. 3, the autonomous vehicle receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the autonomous vehicle transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource. The specific information can be transmitted through a narrowband of 6 resource blocks (RBs) or 1 RB.

The above-described 5G communication technology can be combined with methods proposed in the present disclosure which will be described later and applied or can complement the methods proposed in the present disclosure to make technical features of the methods concrete and clear.

FIG. 4 is a view illustrating an operating system of a mobile agent according to a first embodiment of the present disclosure. According to the first embodiment, a mobile agent denotes a mobile robot 100.

Referring to FIG. 4, according to an embodiment of the present disclosure, an operating system of a mobile agent includes a mobile robot 100, a server 10, and a capturing device 90.

The mobile robot 100 may perform a particular task while moving in a predetermined space. For example, the mobile robot 100 may travel in a public place, e.g., an airport, while guiding users or providing them with information about the public place. The mobile robot 100 may perform a speech recognition service based on a speech recognition model.

The mobile robot 100 may receive space type information from the server 10 or generate space type information based on image information from the capturing device 90. The mobile robot 100 may obtain space type information via sensors equipped in the mobile robot 100. The mobile robot 100 may update the speech recognition model in real-time, corresponding to the space type information obtained in real-time.

The server 10 may receive information from the mobile robot 100 or the capturing device 90. The server 10 may obtain space type information for the particular space where the mobile robot 100 is located on behalf of the mobile robot 100 and may update the speech recognition model based on the space type information. Upon obtaining the space type information or updating the speech recognition model, the server 10 may provide the space type information or speech recognition model to the mobile robot 100.

The capturing device 90 may include a camera installed around an area targeted for cleanup. For example, the capturing device 90 may be a closed circuit television (CCTV) camera. The capturing device 90 may transmit the captured image to the server 10 or the mobile robot 100.

FIG. 5 is a view illustrating a configuration of a mobile robot according to an embodiment of the present disclosure.

Referring to FIG. 5, the mobile robot 100 may include a power supply 60, a driving driver 120, a user input device 130, a display device 140, a sound sensor 150, an image obtaining device 160, a location recognizing device 170, and an object recognizing device 180.

The power supply 60 may include a battery and a battery driver. The battery may be, e.g., a lithium-ion (Li-Ion) battery, and the battery driver may manage the charging and discharging of the Li-Ion battery.

The controller 110 may include a micro-computer for managing the power supply 50 which includes, e.g., a battery, the object recognizing device 180 which includes various sensors, and a driving driver 130 which includes a plurality of motors and wheels among the hardware components of the mobile robot 100.

The controller 110 may include an application processor (AP) which functions to manage all of the hardware components of the mobile robot 100. The AP may run an application program for driving based on location information obtained via various sensors and transmit user input/ output information to the micro-computer to drive, e.g., the motors. The user input device 130, the image obtaining device 160, and the location recognizing device 170 may be managed by the AP.

The controller 110 may obtain space type information based on information from the sensors.

The driving driver 120 includes a wheel motor 121 and a driving wheel 122. The motor 121 may control the driving wheel 122 to roll forwards, rewards, or in any direction.

The user input device 130 transfers various preset control commands or information to the controller 110 according to the user's manipulation and input. The user input device 130 may be implemented as a menu key or input panel provided outside of the display device or as a remote controller separately spaced apart from the mobile robot 100. Part of the configuration of the user input device 130 may be integrally implemented with the display device 142. When the display device 142 is a touchscreen, the user may touch an input menu displayed on the display device, thereby transferring a preset command to the controller 110.

The user input device 130 may detect the user's gesture via a sensor for detection in the area and transfer the user's command to the controller 110. The user input device may the user's speech command to the controller 110, thereby performing operations and settings.

The display 140 may display the operation state of the mobile robot 100 or additional information, e.g., date/time/ temperature/humidity. The display 140 may include a speech output device 141 for transferring the content displayed in the form of a speech and the display device 142 for displaying images.

The image obtaining device 160 may include a two-dimension (2D) camera 161 and a red-green-blue-depth (RGBD) camera 162. The 2D camera 161 may be a sensor for recognizing a human or thing based on a 2D image. The RGBD camera 162 may be a camera with RGBD sensors or may be a sensor for detecting a human or thing based on captured images with depth data obtained from other similar 3D imaging devices.

The object recognizing device 160 obtains an image on the driving route and provides the obtained image data to the controller 110. The controller 110 may reset the driving route based on the image data.

The location recognizing device 170 may include a light detection and ranging (lidar) 171 and a simultaneous localization and mapping (SLAM) camera 172. The SLAM camera 172 may implement simultaneous localization and mapping technology. The mobile robot 100 may detect ambient environment information by the SLAM camera 172, process the obtained information, and create a map corresponding to the space where the mobile robot 100 is on duty while estimating its absolute location. The lidar 171, as a laser radar, may be a sensor which emits laser beams, collects and analyzes beams back-scattered among light beams absorbed or scattered by aerosols, thereby performing location recognition. The location recognizing device 170 may treat and process sensing data gathered by the lidar 171 and the SLAM camera 172, thereby managing data for recognizing the location of the robot and obstacles.

The object recognizing device 180 may include an infrared radiation (IR) remote controller receiver 181, an ultrasonic sensor (USS) 182, a cliff PSD 183, an attitude reference system (ARS) 184, a bumper 185, and an optical flow sensor (OFS) 186. The IR remote controller receiver 181 may include a sensor for receiving signals from an IR remote controller to remotely control the mobile robot 100. The USS 182 may include a sensor for determining the distance between the robot and an obstacle based on an ultrasonic signal. The cliff PSD 183 may include a sensor for sensing, omni-directionally at 360 degrees, a cliff or bluff in the driving range of the mobile robot 100. The ARS 184 may include a sensor for detecting the posture of the robot. The ARS 184 may include a sensor constituted of three acceleration axes and three gyro axes for detecting the quantity of rotation of the mobile robot 100. The bumper 185 may include a sensor for detecting collision between the mobile robot 100 and the obstacle. The sensor included in the bumper 185 may detect the collision between the mobile robot 100 and the obstacle in a 360-degree range. The OFS 186 may include a sensor for measuring the driving distance of the mobile robot 100 on various floor surfaces and wheel idling when the mobile robot 100 drives.

The communication device 190 may be configured as a communication device for Wi-Fi, Bluetooth, infrared radiation (IR), ultra-wideband (UWB), Zigbee, or other know short-range wireless communication or as a mobile communication device, such as for 3G, 4G, LTE, or 5G, or the communication device 180 may alternatively be configured as a known communication port for wired communication.

FIG. 6 is a block diagram illustrating an AI device according to an embodiment of the present disclosure.

Referring to FIG. 6, an AI device 20 may include an electronic device including an AI device capable of AI processing or a server including an AI device. The AI device 20 may be included as a component of the controller 110 of FIG. 5 so that the AI device 20 may perform at least part of AI processing along with the controller 101.

AI processing may include all operations related to the controller 110 of FIG. 4.

The AI device 20 may be a client device which directly uses the results of AI processing or a cloud-environment device which provides the results of AI processing to other devices. The AI device 20 may be a computing device capable of learning neural networks and may be implemented as at least one of various electronic devices, such as servers, desktop PCs, laptop computers, or tablet PCs.

The AI device 20 may include an AI processor 21, a memory 25, and/or a communication device 27.

The AI processor 21 may learn a neural network based on the program stored in the memory 25. In particular, the AI processor 21 may learn a neural network for recognizing data related to operations of the controller 110. The neural network for recognizing the relevant data of the controller 110 may be designed to mimic the human brain on the computer and may include a plurality of weighted network nodes which mimic the neurons of the human neural network. The plurality of network nodes can transmit and receive data in accordance with each connection relationship to simulate the synaptic activity of neurons in which neurons transmit and receive signals through synapses. Here, the neural network may include a deep learning model developed from a neural network model. In the deep learning model, a plurality of network nodes is positioned in different layers and can transmit and receive data in accordance with a convolution connection relationship. The neural network, for example, includes various deep learning techniques such as deep neural networks (DNN), convolutional deep neural networks (CNN), recurrent neural networks (RNN), a restricted boltzmann machine (RBM), deep belief networks (DBN), and a deep Q-network, and can be applied to fields such as computer vision, voice recognition, natural language processing, and voice/signal processing.

Meanwhile, a processor that performs the functions described above may be a general purpose processor (e.g., a CPU), but may be an AI-only processor (e.g., a GPU) for artificial intelligence learning.

The memory 25 can store various programs and data for the operation of the AI device 20. The memory 25 may be a nonvolatile memory, a volatile memory, a flash-memory, a hard disk drive (HDD), a solid state drive (SDD), or the like. The memory 25 is accessed by the AI processor 21 and reading-out/recording/correcting/deleting/updating, etc. of data by the AI processor 21 can be performed. Further, the memory 25 can store a neural network model (e.g., a deep learning model 26) generated through a learning algorithm for data classification/recognition according to an embodiment of the present disclosure.

Meanwhile, the AI processor 21 may include a data learning unit 22 that learns a neural network for data classification/recognition. The data learning unit 22 can learn references about what learning data are used and how to classify and recognize data using the learning data in order to determine data classification/recognition. The data learning unit 22 can learn a deep learning model by acquiring learning data to be used for learning and by applying the acquired learning data to the deep learning model.

The data learning unit 22 may be manufactured in the type of at least one hardware chip and mounted on the AI device 20. For example, the data learning unit 22 may be manufactured in a hardware chip type only for artificial intelligence, and may be manufactured as a part of a general purpose processor (CPU) or a graphics processing unit (GPU) and mounted on the AI device 20. Further, the data learning unit 22 may be implemented as a software module. When the data leaning unit 22 is implemented as a software module (or a program module including instructions), the software module may be stored in non-transitory computer readable media that can be read through a computer. In this case, at least one software module may be provided by an OS (operating system) or may be provided by an application.

The data learning unit 22 may include a learning data acquiring unit 23 and a model learning unit 24.

The learning data acquiring unit 23 can acquire learning data required for a neural network model for classifying and recognizing data. For example, the learning data acquiring unit 23 can acquire, as learning data, vehicle data and/or sample data to be input to a neural network model.

The model learning unit 24 can perform learning such that a neural network model has a determination reference about how to classify predetermined data, using the acquired learning data. In this case, the model learning unit 24 can train a neural network model through supervised learning that uses at least some of learning data as a determination reference. Alternatively, the model learning data 24 can train a neural network model through unsupervised learning that finds out a determination reference by performing learning by itself using learning data without supervision. Further, the model learning unit 24 can train a neural network model through reinforcement learning using feedback about whether the result of situation determination according to learning is correct. Further, the model learning unit 24 can train a neural network model using a learning algorithm including error back-propagation or gradient decent.

When a neural network model is learned, the model learning unit 24 can store the learned neural network model in the memory. The model learning unit 24 may store the learned neural network model in the memory of a server connected with the AI device 20 through a wire or wireless network.

The data learning unit 22 may further include a learning data preprocessor (not shown) and a learning data selector (not shown) to improve the analysis result of a recognition model or reduce resources or time for generating a recognition model.

The learning data preprocessor can preprocess acquired data such that the acquired data can be used in learning for situation determination. For example, the learning data preprocessor can process acquired data in a predetermined format such that the model learning unit 24 can use learning data acquired for learning for image recognition.

Further, the learning data selector can select data for learning from the learning data acquired by the learning data acquiring unit 23 or the learning data preprocessed by the preprocessor. The selected learning data can be provided to the model learning unit 24. For example, the learning data selector can select only data for objects included in a specific area as learning data by detecting the specific area in an image acquired through a camera of a vehicle.

Further, the data learning unit 22 may further include a model estimator (not shown) to improve the analysis result of a neural network model.

The model estimator inputs estimation data to a neural network model, and when an analysis result output from the estimation data does not satisfy a predetermined reference, it can make the model learning unit 22 perform learning again. In this case, the estimation data may be data defined in advance for estimating a recognition model. For example, when the number or ratio of estimation data with an incorrect analysis result of the analysis result of a recognition model learned with respect to estimation data exceeds a predetermined threshold, the model estimator can estimate that a predetermined reference is not satisfied.

The communication unit 27 can transmit the AI processing result by the AI processor 21 to an external electronic device.

Here, the external electronic device may be defined as an autonomous vehicle. Further, the AI device 20 may be defined as another vehicle or a 5G network that communicates with the autonomous vehicle. Meanwhile, the AI device 20 may be implemented by being functionally embedded in an autonomous module included in a vehicle. Further, the 5G network may include a server or a module that performs control related to autonomous driving.

Meanwhile, the AI device 20 shown in FIG. 5 was functionally separately described into the AI processor 21, the memory 25, the communication unit 27, etc., but it should be noted that the aforementioned components may be integrated in one module and referred to as an AI module.

Although the AI device 20 of FIG. 6 is functionally separated into the AI processor 21, the memory 25, and the communication device 27, the above-described components may be integrated into a single device which may be referred to as an AI device.

FIG. 7 is a flowchart illustrating a method of updating a speech recognition model according to an embodiment of the present disclosure.

A method of updating a speech recognition model is described below with reference to FIG. 7.

In a first step S710, space type information for the space where the mobile agent is located is obtained in real-time.

The mobile agent may be the mobile robot 100 described above in connection with FIGS. 4 and 5. Particular space denotes the space where the mobile robot 100 is located. The particular space may be varied as the mobile robot 100 moves. Space type information denotes properties of the particular space. The space type information includes variables which may influence speech recognition. The space type information may be obtained by the server 10 or directly by the mobile robot 100.

In a second step S720, the parameters of the speech recognition model are varied based on the space type information.

The speech recognition model may include a plurality of speech recognition processing schemes, and the plurality of speech recognition processing schemes may include one or more parameters. In a method of varying the parameters of the speech recognition model, the size of at least any one of the plurality of parameters may be varied in proportion to the degree of variation in the space type information. Since the space type information has been generated based on the sensing information obtained from the sensing device, the parameters of the speech recognition model may be varied in proportion to the degree of variation in the sensing information.

In a third step S730, the mobile robot 100 performs a speech recognition service based on the speech recognition model including the varied parameters.

The method of obtaining the space type information is described below in greater detail.

FIG. 8 is a view illustrating a method of obtaining space type information by a mobile robot.

Referring to FIG. 8, first to sixth mobile robots 100-1 to 100-6 may be moved under the user's control or by a preset algorithm. In other words, the first mobile robot 100-1 of FIG. 8 may move to where the second to sixth mobile robots 100-2 to 100-6 or to other places within a predetermined range.

The mobile robot 100-1 obtains space type information in real-time while entering a particular space or staying in the particular space for a predetermined period. Obtaining the space type information in real-time means updating the space type information in each predetermined period unit.

The space type information may be obtained based on sensing information obtained by the sensing device of the mobile robot 100-1 or based on sensing information obtained from the server 10 or other external device (not shown). For example, the mobile robot 100-1 may obtain the space type information based on images captured by external cameras 90-1, 90-2, and 90-3.

The sensing information denotes a particular physical quantity or analog information obtained from the sensing device.

Alternatively, when the mobile robot 100-1 enters the particular space, space type information learned on the particular space may be received. The learned space type information may be information learned using meta information, such as time or weather, as an input value in the particular space.

The space type information denotes area information, distance information, noise information, direction-to-opening information, or howling information.

The area information is information resultant from quantifying the area inside the border surface surrounding the particular space where the mobile robot 100-1 is located. The border surface may be a wall or obstacle and may be one sealing off the particular space. However, the particular space is not necessarily limited to a space physically completely sealed off. The particular space may be defined as a space where transfer of a speech signal may be blocked off at a predetermined level or as an internal space surrounded by an obstacle in such an extent that a speech signal may be refracted and reflected.

The distance information may be information resultant from quantifying the distance between the mobile robot 100-1 and the border surface of the particular space or the distance between the mobile robot 100-1 and the user's location. The user's location may correspond to the location in which the user of the mobile robot 100-1 typically transmits speech signals. The distance information may be obtained by analyzing images captured by a 2D or 3D camera.

The distance information may also be obtained by an ultrasonic sensor.

The noise information may be information resultant from quantifying the noise in the particular space and may be a value in decibels (dBA) obtained by the sound sensor 150.

The direction-to-opening direction is information indicating the direction in which a pathway connecting the border surface of the particular space to the outside of the particular space is located. For example, in a case where the particular space is a room, the direction-to-opening direction may be the direction in which a door is located. The direction-to-opening may be indicated with respect to a cardinal direction or may correspond to a relative position from the mobile robot 100-1.

The howling information denotes the degree of howling and may be obtained by the sound sensor 150.

FIGS. 9A and 9B are views illustrating a method of varying parameters of a speech recognition model. FIG. 9A illustrates an example parameter variation model. FIG. 9B illustrates a process of varying parameters of a speech recognition model based on a parameter variation model.

Referring to FIGS. 9A and 9B, space type information may be learned to vary the parameters of the speech recognition model.

The parameter variation model may receive space type information. The parameter variation model may receive valid pieces of space type information that do not overlap each other. The parameter variation model may learn the relation between a plurality of pieces of space type information and parameters of the speech recognition model and obtain parameter variations of the speech recognition model based on a result of the learning.

The controller 110 may update the speech recognition model based on the parameter variations of the speech recognition model.

FIG. 10 is a flowchart illustrating a method of updating a speech recognition model according to another embodiment of the present disclosure. FIG. 10 illustrates a method of updating an additional speech recognition model based on performing a speech recognition service after updating a speech recognition model.

Referring to FIG. 10, a speech recognition model updating method performs a speech recognition service in a first step S1010. The first step S1010 may correspond to the third step S730 of FIG. 7.

In a second step S1020, the reliability of the speech recognition service is calculated.

The reliability of the speech recognition service means the success rate at which the mobile robot 100 recognizes a speech command from the user. When recognizing the speech command from the user, the mobile robot 100 counts the corresponding speech recognition event as "recognition success" and converts the speech command into text based on the speech recognition model. If the mobile robot 100 fails to recognize the user's speech command, the mobile robot 100 counts the corresponding speech recognition event as "recognition failure." The mobile robot 100 determines the reliability by calculating the ratio of the speech recognition events determined to be "recognition success" to all the speech recognition events.

In a third step S1030, the mobile robot 100 determines whether the reliability of speech recognition is a threshold or more.

The threshold of the speech recognition reliability may be preset. For example, the threshold may be set to 90%. In other words, if 100 speech recognition events have been tried based on a particular speech recognition model and, among them, 90 speech recognition events have been determined as "recognition success," the reliability of speech recognition may be determined to be the threshold or more.

In a fourth step S1040, when the reliability of speech recognition is the threshold or more, the current speech recognition is maintained. The speech recognition model used in the fourth step S1040 denotes a speech recognition model updated based on space type information. Maintaining the speech recognition model in the fourth step S1040 does not necessarily mean that the same speech recognition model is continuously used afterwards corresponding to the space type information. As the space type information is varied, an additional change may be made to the speech recognition model. In particular, although the same space type information is obtained, the parameters of the speech recognition model may be varied by AI learning.

When the reliability of speech recognition is less than the threshold, the parameters of the speech recognition model are varied in a fifth step S1050. To vary the parameters of the speech recognition model, additional learning may be carried out based on the parameter variation model.

FIG. 11 is a flowchart illustrating a method of updating a speech recognition model according to another embodiment of the present disclosure.

Referring to FIG. 11, in a first step S1110, the reliability of speech recognition is calculated. The first step S1110 may correspond to the second step S1020 of FIG. 10.

In a second step S1120, when the reliability of speech recognition is less than a threshold, a faulty pattern is generated. The second step S1120 may be regarded as an additional step to the fifth step S1050 of FIG. 10.

Faulty pattern denotes a match between space type information and a parameter of a modulated speech recognition model corresponding to the space type information. Table 1 represents a method of selecting a faulty pattern.

TABLE 1

| | space type information | | | processing scheme | | | |
| --- | --- | --- | --- | --- | --- | --- | --- |
| | #1 | #2 | #3 | scheme 1 | scheme 2 | scheme 3 | reliability |
| pattern 1 | calm | right | area × a | Aa | Ba | Ca | 95 |
| pattern 2 | severe | left | area × b | Ab | Bb | Cb | 90 |
| pattern 3 | severe | right | area × b | Ac | Ba | Cb | 83 |
| pattern 4 | calm | left | area × c | Aa | bb | Cc | 78 |
| . . . | . . . | . . . | . . . | . . . | . . . | . . . | . . . |

Referring to Table 1, the space type information includes "#1" to "#3". "#1" denotes noise information, "#2" denotes direction-to-opening information, and "#3" denotes area information. "Scheme 1" to "scheme 3" each denote a particular speech recognition processing scheme, and each of "scheme 1" to "scheme 3" may be an algorithm for enhancing the performance of speech recognition corresponding to one or more pieces of particular space type information. Alternatively, "scheme 1" to "scheme 3" may correspond to no particular space type information.

Although the space type information is represented as having a large range in Table 1 above, the space type information may also be represented as an equation for expressing it as close to an analog signal as possible. The degree of variation in the parameters Aa, Ab, Ac, Ba, bb, Ca, Cb, and Cc of the processing schemes of the speech recognition model may be resized in proportion to the degree of variation in the space type information.

"Pattern 1" to "pattern 4" denote the pieces of space type information and the parameters of the processing schemes of speech recognition model which have been varied corresponding to the pieces of space type information. The reliability means a reliability of when the speech recognition service is performed based on "pattern 1" to "pattern 4." When the threshold is 90%, the reliability of "pattern 1" and "pattern 2" is a threshold or more as shown in Table 1.

In contrast, the reliability of "pattern 3" and "pattern 4" is less than the threshold. The mobile robot 100 regards patterns with a reliability less than the threshold, such as "pattern 3" and "pattern 4", as faulty patterns.

In a third step S1130, the subject of learning to update the speech recognition model, e.g., the mobile robot 100, excludes faulty patterns in an additional learning process. Excluding faulty patterns means such learning as to prevent the patterns from reoccurring. In other words, although the space type information corresponding to "pattern 2" is obtained again, the mobile robot 100 performs learning so that such parameter variations are not made that the parameter of processing scheme 1, the parameter of processing scheme 2, and the processor of processing scheme 3 are Aa, bb, and Cc, respectively. Excluding faulty patterns may mean preventing all of the parameters of the processing schemes from being elicited from identical to those of the faulty patterns, and patterns in which only the parameter corresponding to any one processing scheme is varied may be output.

FIG. 12 is a view illustrating a method of updating a speech recognition model according to another embodiment of the present disclosure.

The controller 110 of the mobile robot 100 may control the communication device 190 to transmit space type information for the mobile robot 100 to the AI processor included in the 5G network. The controller 110 may control the communication device 190 to receive AI-processed information from the AI processor. The AI-processed information may be a varied parameter of a speech recognition model.

The controller 110 may transmit space type information obtained by the mobile robot 100 to the network based on downlink control information (DCI) (S1200). The space type information may be transmitted to the network via a physical uplink shared channel (PUSCH), and the DM-RSs of the synchronization signal block (SSB) and PUSCH may be quasi co-located (QCL) for QCL type D.

The 5G network may include an AI processor or an AI system, and the AI system of the 5G network may perform AI processing based on the received information.

The AI system may analyze the space type information received from the mobile robot 100 (S1210). The AI system may obtain parameter variations based on the result of analysis of the space type information (S1220).

The 5G network may transmit the parameter variations obtained by the AI system to the mobile robot 100 via a wireless communication device (S1230).

FIGS. 13, 14, and 15 are views illustrating a method of updating a speech recognition model of a robot vacuum.

Referring to FIG. 13, a robot vacuum 500 includes an inlet (not shown) exposed form the housing 50 and sucks in debris from the floor through the inlet while moving on its own. Like the mobile robot 100 of FIG. 5, the robot vacuum 500 may include a controller, a driving driver, a user input device, a display, an image obtaining device, a location recognizing device, and an object recognizing device. The display may include a speech output device 141 for outputting speech and a display device 142 for displaying images.

The robot vacuum 500 may be equipped with a speech recognition model and be operated based on the speech recognition model and speech recognition.

Referring to FIG. 14, the robot vacuum 500 regards the floor, which is targeted for cleanup, as a cleanup map CM and drives in all areas where it is movable on the cleanup map CM.

The cleanup map CM may include a plurality of cells regularly arrayed in 2D. Each cell C may be distinguished by its unique location coordinates, which may be 2D coordinates, from another. For example, each cell C may have unique coordinates, and each edge of the cell may have unique coordinates. In the cleanup map CM, the width of the cell C may be set as the width at which the cleanup is performed while the robot vacuum 500 proceeds, but the size of the cell C is not limited thereto.

The robot vacuum 500 sequentially moves on each cell C from a start point SP to an end point EP, resultantly driving on all of the cells C of the cleanup map CM.

Referring to FIG. 15, the robot vacuum 500 may drive in places with different pieces of space type information. Whenever entering each place shown in FIGS. 15A, 15B, and 15C, the robot vacuum 500 may obtain space type information for the space. The above-described embodiments may be used to obtain the space type information.

The robot vacuum 500 may update the speech recognition model based on the obtained space type information. The embodiments shown in FIGS. 9A to 12 may be used to update the speech recognition model.

As such, the robot vacuum 500 may update the speech recognition model in real-time and update an additional speech recognition model based on reliability assessment. By so doing, the robot vacuum 500 may enhance the performance of speech recognition.

The above-described disclosure may be implemented in computer-readable code in program-recorded media. The computer-readable media include all types of recording devices storing data readable by a computer system. Example computer-readable media may include hard disk drives (HDDs), solid state disks (SSDs), silicon disk drives (SDDs), ROMs, RAMs, CD-ROMs, magnetic tapes, floppy disks, and/or optical data storage, and may be implemented in carrier waveforms (e.g., transmissions over the Internet). The foregoing detailed description should not be interpreted not as limiting but as exemplary in all aspects. The scope of the present disclosure should be defined by reasonable interpretation of the appended claims and all equivalents and changes thereto should fall within the scope of the disclosure.

The foregoing features, structures, or effects are included in, but not limited to, at least one embodiment of the present disclosure. The features, structures, or effects exemplified in each embodiment may be combined or modified by one of ordinary skill in the art in other embodiments. Thus, such combinations or modifications should be interpreted as belonging to the scope of the present disclosure.

While the present disclosure has been shown and described with reference to exemplary embodiments thereof, it will be apparent to those of ordinary skill in the art that various changes in form and detail may be made thereto without departing from the spirit and scope of the present disclosure as defined by the following claims. For example, each component in the embodiments may be modified. Such modifications and applications should be construed as included in the scope of the present disclosure as defined by the appended claims.

What is claimed is:

1. A method of updating a speech recognition model using a mobile agent in real-time, the method comprising:
    obtaining, in real-time, space type information for a particular space where the mobile agent is located;
    varying, in real-time, parameters of a speech recognition model used in the particular space based on the space type information; and
    performing a speech recognition service based on the speech recognition model including the varied parameters,
    wherein the obtaining the space type information includes:
    obtaining sensing information corresponding to analog information or a particular physical quantity of the particular space by a sensing device; and
    obtaining area information, distance information, noise information, and howling information for the particular space based on the sensing information.

2. The method of claim 1, wherein the obtaining the space type information includes:
    detecting entry of the mobile agent into the particular space by grasping a location of the mobile agent; and
    receiving preset space type information corresponding to the particular space.

3. The method of claim 1, wherein the obtaining the space type information includes obtaining a variation in the sensing information.

4. The method of claim 3, wherein the speech recognition model includes a plurality of parameters each of which corresponds to a respective one of a plurality of speech processing schemes, and wherein the varying the parameters of the speech recognition model includes varying a size of at least any one of the plurality of parameters in proportion to the variation in the sensing information.

5. The method of claim 1, wherein the varying the parameters of the speech recognition model includes performing artificial intelligence (AI) learning using the space type information as an input value.

6. The method of claim 5, further comprising:
    performing the speech recognition service based on the speech recognition model;
    determining a reliability of the speech recognition service;
    when the reliability of the speech recognition service is less than a preset threshold, matching the space type information and parameters of the speech recognition model modulated corresponding to the space type information to thereby generate a faulty pattern; and
    preventing the faulty pattern from being generated in a subsequent AI learning by dropping the faulty pattern.

7. The method of claim 6, further comprising, when the reliability of the speech recognition service is less than the preset threshold, varying again the parameters of the speech recognition model.

8. The method of claim 5, wherein the varying the parameters of the speech recognition model includes receiving, from a network, downlink control information (DCI) used for scheduling transmission of the space type information, and wherein the space type information is transmitted to the network based on the DCI.

9. The method of claim 8, wherein the varying the parameters of the speech recognition model includes performing an initial access procedure with the network based on a synchronization signal block (SSB), wherein the space type information is transmitted to the network via a physical uplink shared channel (PUSCH), and wherein dedicated demodulation reference signals (DM-RSs) of the SSB and the PUSCH are quasi co-located (QCL) for QCL type D.

10. A mobile agent for performing a speech recognition service based on a speech recognition model, the mobile agent comprising:
    a sensing device obtaining sensing information corresponding to analog information or a particular physical quantity of a particular space; and
    a processor obtaining space information based on the sensing information, obtaining space type information for the particular space, and varying, in real-time, parameters of the speech recognition model based on the space type information,
    wherein the obtaining the space type information includes:
    obtaining sensing information corresponding to analog information or a particular physical quantity of the particular space by a sensing device; and
    obtaining area information, distance information, noise information, and howling information for the particular space based on the sensing information.

11. The mobile agent of claim 10, wherein the processor obtains a variation in the sensing information and varies a size of at least one of the parameters of the speech recognition model in proportion to the variation in the sensing information.

12. The mobile agent of claim 10, wherein the processor performs artificial intelligence (AI) learning using the space type information as an input value.

13. The mobile agent of claim 12, wherein the processor determines a reliability for performing the speech recognition service based on the speech recognition model and, when the reliability is less than a preset threshold, matches the space type information and parameters of the speech recognition model modulated corresponding to the space type information to thereby generate a faulty pattern.

14. The mobile agent of claim 13, wherein the processor prevents the faulty pattern from being generated in a subsequent AI learning by dropping the faulty pattern.

15. The mobile agent of claim 10, wherein a communication device transmitting the space type information to a server or a 5G network and receiving the varied parameters of the speech recognition model generated based on the space type information.

* * * * *